United States Patent [19]

Lenz et al.

[11] Patent Number: 4,747,700
[45] Date of Patent: May 31, 1988

[54] THERMOCOUPLE RAKE

[75] Inventors: Herman N. Lenz, Lambertville, Mich.; John M. Kasper, Toledo, Ohio

[73] Assignee: Teledyne Industries, Inc., Los Angeles, Calif.

[21] Appl. No.: 64,109

[22] Filed: Jun. 19, 1987

[51] Int. Cl.⁴ .................. G01K 1/16; G01K 13/02
[52] U.S. Cl. ................................. 374/135; 374/29; 374/179; 374/208
[58] Field of Search .............. 374/135, 179, 208, 163, 374/29, 138, 147, 166, 115, 116; 73/195

[56] References Cited

U.S. PATENT DOCUMENTS

| 3,623,367 | 11/1971 | Benedict | 374/115 X |
| 4,420,965 | 12/1983 | Farkas et al. | 374/43 |
| 4,463,800 | 8/1984 | Hadden | 374/208 X |
| 4,572,677 | 2/1986 | Sehgal | 374/166 X |

Primary Examiner—Daniel M. Yasich
Attorney, Agent, or Firm—Gifford, Groh, VanOphem, Sheridan, Sprinkle and Dolgorukov

[57] ABSTRACT

A thermocouple rake for measuring the temperature of heated fluids. The thermocouple rake is provided with a cooling chamber for circulating a coolant about individual thermocouple assemblies to cool the assemblies during use in the hot gas. A U-shaped channel is formed downstream in the flow of fluid to accept lead wires from the thermocouple assemblies to deflect the hot gas fluid from contacting the lead wires.

13 Claims, 2 Drawing Sheets

THERMOCOUPLE RAKE

FIELD OF THE INVENTION

This invention relates to test rakes and, in particular, to thermocouple rakes for use in the measurement of the temperature of fluids.

DESCRIPTION OF THE PRIOR ART

It is known to use an output voltage produced at the junction of two different metals in a thermocouple assembly to determine the temperature at the junction.

Rakes having a number of spaced apart thermocouple assemblies have been used to determine the temperature of fluids at different points within the flow of a fluid. Such rakes are frequently used to measure the temperature of exhaust gasses in tests conducted on combustion systems. These rakes are each provided with a rake body supporting a number of thermocouple assemblies aligned in a row. The rake body is mounted in an exhaust chamber so that each of the thermocouple assemblies is positioned at a predetermined point in the flow of exhaust gas. The output voltage from each thermocouple assembly is fed through wires to a device which converts the output voltage to a temperature reading for each of the thermocouple assemblies. It is necessary to support the thermocouple assemblies and wires due to the great heat of the exhaust gasses which may be as high as 3200° C.

The rake body and wire shields are custom fabricated out of platinum or other expensive material capable of withstanding the extreme heat. However, rakes and wire shields formed of platinum or other insulative metal are quite expensive. Additionally, the fabrication of individual rakes for each specific test rig or flow path is expensive.

SUMMARY OF THE PRESENT INVENTION

The present invention overcomes these disadvantages and others by providing a test rake having a structure which permits elimination of up to 95% of the platinum or other expensive material; permits easy removal and replacement of sensor probes such as thermocouple assemblies, static pressure, total pressure, gasseous emissions or particulate emissions; and permits a variety of test configurations. The test rake according to the invention has a rake body formed of an expensive metal having an inner chamber and a plurality of tubes extending across the chamber. A coolant is passed through the chamber about measurement probes which are mounted in the tubes. The probes may be positioned as desired in any of the tubes. The coolant is introduced into the chamber through an inlet at one end of the rake body. The coolant circulates through the chamber to cool the probes or the thermocouple assemblies in the tubes. Each thermocouple assembly is provided with an insulated connector for removal and replacement of the thermocouple assemblies. A U-shaped channel is formed to receive the wires downstream of the thermocouple assemblies and to shield the wires from the exhaust gasses. Thus the device provides an inexpensive and simple test rake having replaceable thermocouple assemblies or probes which are positionable as desired.

It is therefore an object of this invention to provide a test rake which is inexpensive to build and easy to use.

It is a further object of the invention to provide a thermocouple rake in which test probes or thermocouple assemblies may be easily and readily replaced.

It is another feature of the invention to provide a test rake which may be fabricated from inexpensive metal.

It is yet another feature of the invention to provide a test rake in which thermocouple assemblies and probes may be positioned in any of a plurality of positions.

Other objects, features, and advantages of the invention will be apparent from the following detailed description taken in conjunction with the accompanying drawings.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views and in which.

A DETAILED DESCRIPTION OF A PREFERRED EMBODIMENT

Figure 1:
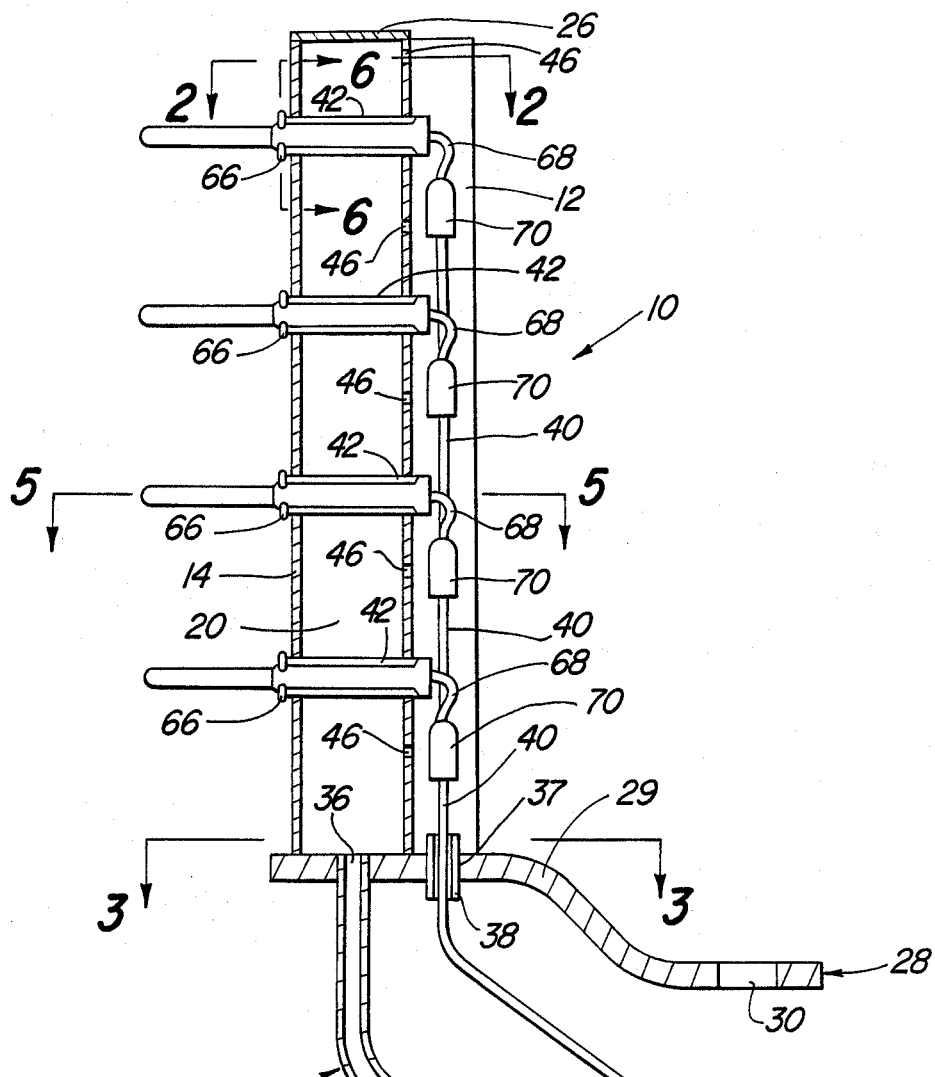
FIG. 1 is a sectional side view of the preferred embodiment of the present invention.
Figure 2:
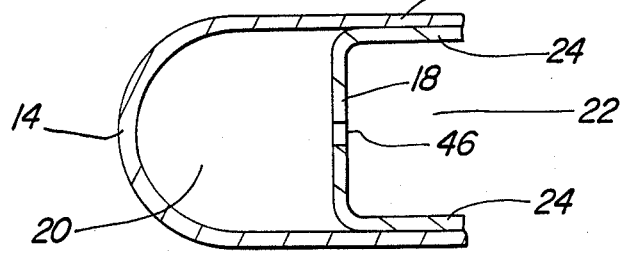
FIG. 2 is a sectional top view taken through lines 2—2.

Referring to FIG. 1, a test rake 10 according to the invention has an elongated U-shaped body 12. As is best shown in FIG. 2, the U-shaped rake body has a leading edge 14 and a pair of spaced apart side walls 16 extending rearwardly. A rear wall 18 extends between the pair of side walls 16 to form a chamber 20. The rear wall 18 is spaced inwardly from free ends of the side walls 16 to create a channel 22 which is on an opposite side of the rear wall 18 from the chamber 20. In the preferred embodiment, a pair of flange portions 24 extend normally from the rear wall 18 and are affixed to a respective one of each of the pair of side walls 16 of the rake body 12. The rear wall 18 is sealingly affixed to each of the pair of side walls 16/12 of the rake body in a suitable manner such as by welding. The chamber 20 formed thereby is fluid tight. The rake body 12 and rear wall 18 may be formed of any suitable rigid material such as stainless steel. This material is not required to provide thermal insulation.

As best shown in FIG. 1, An end cap 26 extends from the leading edge 14 at the top of the rake body 12 to the rear wall 18 to enclose the cavity. A lower portion of the rake body 12 is fixedly mounted to a base or mounting member 28. The rake body 12 extends vertically upwardly from the mounting member 28. The end cap 26 and mounting member 28 are preferably formed of the same material as the rake body 12 and are sealingly affixed to the rake body 12 by a suitable method such as welding. The mounting member 28 has a vertically extending portion 29 which may be bent or shaped, as desired, to position the rake 10 in a desired position within the flow of exhaust fluid. A hole 30 is formed in the mounting member 28 for accepting a bolt or stud (not shown) for securing the rake 10 in position within the exhaust chamber. The rake 10 according to the invention may be disposed for measurement of the properties of any material, but is particularly suited for measurement of the parameters of hot gases occurring during combustion system tests. The rake 10 is disposed downstream of the combustion chamber with the leading edge 14 disposed to face the direction of the flow of gas and with the channel 22 disposed downstream.

One end of a conduit 32 is mounted to the mounting member 28 beneath the rake body 12. The other end of the conduit 32 is provided with a coupling 34 for connection to a pressurized source of coolant (not shown). The coolant may be of any suitable type such as ambient air or water. Coolant is drawn from the source through the conduit 32 and is passed through an inlet 36 formed in the mounting member 23 into the chamber 20 of the rake body 12.

Figure 3:
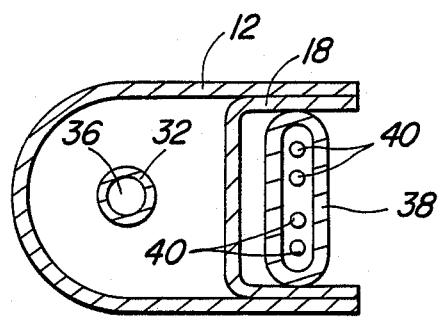
FIG. 3 is a top view of the rake body taken along lines 3—3.

An aperture 37 is formed through the mounting member 28 in an area beneath the channel 22. A grommet 38 is mounted in the aperture 37 to accept wire shields 40 as shown in FIG. 3, for a purpose set forth below.

As is shown in FIG. 1, a plurality of cylindrical tubes 42 are mounted in the rake body 12 extending transversely across the chamber between the leading edge 14 and the rear wall 18. Each of the plurality of tubes 42 is adapted to slidingly accept a signal generating element, as for example, a probe or thermocouple assembly 44. The tubes 42 may be of any desired number and are spaced apart to position the thermocouple couple elements at a desired position. Although thermocouple assemblies are known, it is within the contemplation of the invention to mount probes for measuring other properties of the gasses such as pressure or emmissions. Such probes (not shown) are mounted in the same manner as the thermocouple assemblies 44.

Each of the tubes 42 is sealingly mounted to the rake body 12. The rake 10 may be adapted for use in different combustion system tests by positioning the thermocouple elements or probes in any desired tube. The tubes 42 are preferably made of the same material such as the rake body 12 and are installed within the rake body 12 such that coolant, flowing upwardly from the inlet 36 into the chamber, flows around each of the tubes 42. In this manner, the rake body 12 and the probes or thermocouple assemblies mounted to the rake body 12 are cooled and protected from the temperature of the heat of gasses flowing around the rake body 12. This arrangement does not require the use of platinum or expensive metals to support the thermocoupe element.

Figure 4:
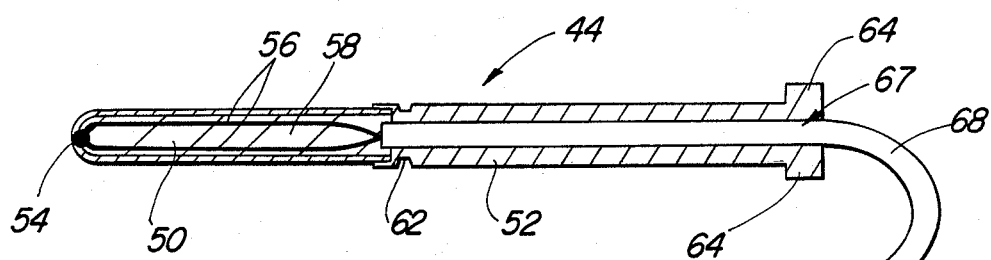
FIG. 4 is a side elevational view of a thermocouple element and connector.

Outlet orifices 46 are formed in the rear wall 18 to permit the coolant to be expelled from the chamber after flowing about and cooling the tubes. In the preferred embodiment, one outlet orifice 46 is positioned in the rear wall 18 beneath each of the tubes 42. The outlet orifices 46 thus direct the coolant outwardly and rearwardly into the fluid flow, downstream of the measurement location. As is shown in FIG. 4, each thermocouple assembly 44 has an element with a probe portion or tip 50 affixed to one end of a mounting fitting 52. The tip 50 is formed of material capable of sustaining high temperatures. The tip 50 houses a pair of metal wires 56 having different thermal conductivity which are connected together to form a junction 54 at an outer end of the probe 50. A voltage differential responsive to the temperature of the fluid occures in the pair of wires 56 as is known. The pair of thermocouple wires 56 is surrounded by insulation 58.

The mounting fitting 52 is cylindrical in shape and adapted to be securely received within each of the tubes 42 of the rake body 12.

Figure 5:
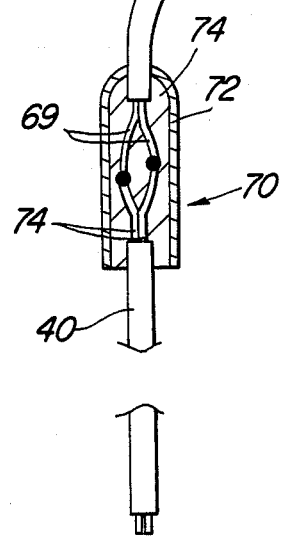
FIG. 5 is a top sectional view of a thermocouple element and rake body as taken along line 5—5.
Figure 5:
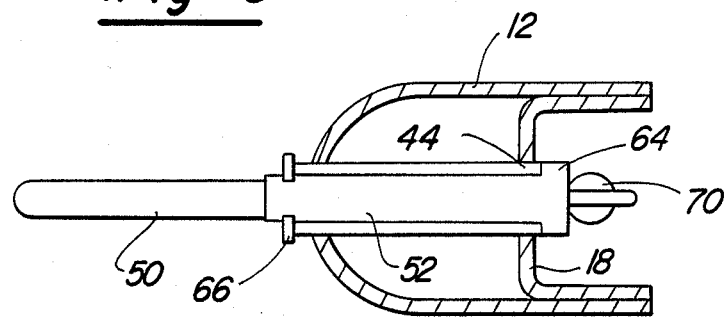
Figure 6:
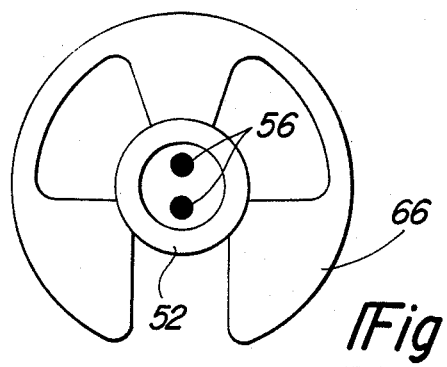
FIG. 6 is a front view of a thermocouple element and clip.

A shoulder 64 extends radially outwardly from one end of the mounting fitting 52 to engage an end of the tube 42 when the thermocouple assembly 44 is positioned therein, as is shown in FIG. 5. A circumferential groove 62 is formed at an opposite end of the mounting fitting 52 adjacent to the tip 50. The clip 66 is then inserted into the groove 62 of the mounting fitting 52 which is positioned external to the leading edge 14 to retain the thermocouple element securely in position within the tube 42. The clip 66 may be of any suitable type such as a C-clip, as best illustrated in FIG. 6.

Extending through an axial bore 67 in the mounting fitting 52 is a wire shield 68. The wire shield 68 extends out of the opposite end of the mounting fitting 52 into the channel 22 of the rake body 12 as is shown in FIG. 1. The wire shield 68 may thus be formed of a material which is suited for low temperatures as the wire shield 68 is protected from the hot fluid or gas by the sides of the rake body 12 forming the channel 22. Enclosed in the wire shield 68 are a pair of electrically conductive wires 69 conducting the voltage from the junction 54. As best shown in FIG. 4, a connector 70 is affixed on a free end of the wire shield 68 to permit easy disconnection and reconnection of thermocouple assembly 44 for removal and replacement of the thermocouple assembly 44. The connector 70 is composed of a bell-shaped shield 72 containing insulation material 74. Within the connector 70, electrically conductive wires 69 from the thermocouple element are connected to wires 74 housed in the wire shield 40. In order to further cool the wire shield 68 and connector 70, the connectors 70 for each thermocouple element may be positioned within the channel 22 of the rake body 12 directly opposite a respective outlet orifice 46, as best shown in FIG. 1. From each connector 70, electrical wires 74 and low temperature wire shield 40 extend downwardly behind the rear wall 18 of the rake body 12 to pass through the grommet 38 in the mounting member 28 to a meter or other device 76 located remotely which converts the voltage into a temperature reading as is known.

It will be appreciated by those skilled in the art that the specific examples which are described herein have been given for illustrative purpose only. For example, the rake body may be aligned horizontally or vertically and may be arranged to support the probes or thermocouple assemblies in a variety of various alignments. Further, it is not necessary to expell the coolant into the exhaust gas but could be returned to the coolant supply for recirculation.

What I claim is:

1. A device for sensing and measuring physical properties of a fluid at a plurality of predetermined locations within a flow of fluid, said device comprising:
   a source of coolant fluid;
   a rake body defining a fluid tight interior chamber, said rake body having means for communicating said coolant fluid from said source of coolant fluid to said chamber, and means for expelling said coolant fluid from said chamber such that said coolant fluid flows through said chamber;
   a plurality of spaced apart mounting members mounted to said rake body, each of said plurality of mounting members mounted in a spaced apart relationship extending through said chamber for cooling by the flow of coolant fluid through said chamber;

a plurality of probe assemblies, each of said plurality of probe assemblies having a tip portion with a sensor therein generating a signal and a mounting portion, each of said plurality of probe assemblies demountably positioned in a respective one of said plurality of mounting members with said tip portion extending into said flow of measured fluid and said mounting portion being received within said respective one of said mounting members for cooling, each of said probe assemblies further having means for communicating said signal; means for converting said signal from each said probe to a measurement of said physical properties; and means for selectively locking each of said plurality of probe assemblies in a respective one of said plurality of mounting members.

2. The device as claimed in claim 1 wherein said rake body further comprises:

an elongated U-shaped member having a curved leading portion facing said flow of measured fluid and a pair of spaced-apart side portions.

3. The device as claimed in claim 2 wherein a mounting member is affixed to an end of said U-shaped member.

4. The device as claimed in claim 3 wherein said U-shaped member further comprises;

a transverse rear wall extending between side portions of said U-shaped member to define said chamber.

5. The device as claimed in claim 4 wherein said mounting member comprises:

a tube member extending between said leading portion and said rear wall.

6. The device as claimed in claim 4 wherein said plurality of probe assemblies comprises a mounting portion adapted to slide into said tube member, said mounting portion having a front end adjacent said tip portion and a rear end having a shoulder portion abutting said tube member to prevent axial displacement of said probe assembly.

7. The device as claimed in claim 6 wherein each of said plurality of probe assemblies comprises;

a groove in said front end of said mounting portion; and said means for locking comprises a clip affixed in said groove of each of said plurality of probe assemblies.

8. The device as claimed in claim 6 wherein said means for expelling coolant fluid comprises at least one outlet hole formed in said rear wall and directing said coolant fluid downstream into said flow of measured fluid.

9. The device as claimed in claim 8 wherein at least one of said plurality of probe assemblies further comprises a thermocouple assembly.

10. The device as claimed in claim 9 wherein the means for communicating said signal comprises a pair of electrically insulated lead wires extending from each of said thermocouple assembly.

11. The device of claim 10 wherein said spaced apart side portions extend outwardly downstream from said rear wall to define a channel therebetween.

12. The device as claimed in claim 11 wherein the means for communicating said signal further comprises a connector for each pair of electrical lead wires, each connector having a shield portion and being positioned in said channel of said rake body.

13. The device as claimed in claim 12 wherein said at least one outlet comprises a plurality of outlets, each of said plurality of outlets positioned in said rear wall adjacent said connector in said channel for directing coolant fluid from said cavity on said connector.

* * * * *